(12) United States Patent
McCarthy (10) Patent No.: US 11,582,917 B2
(45) Date of Patent: Feb. 21, 2023

(54) BIOFIELD MODULATOR

(71) Applicant: Guy McCarthy, Tucson, AZ (US)

(72) Inventor: Guy McCarthy, Tucson, AZ (US)

(*) Notice: Subject to any disclaimer, the term of this patent is extended or adjusted under 35 U.S.C. 154(b) by 461 days.

(21) Appl. No.: 16/795,327

(22) Filed: Feb. 19, 2020

(65) Prior Publication Data

US 2020/0267906 A1 Aug. 27, 2020

Related U.S. Application Data

(60) Provisional application No. 62/810,715, filed on Feb. 26, 2019.

(51) Int. Cl.
*A01G 7/04* (2006.01)

(52) U.S. Cl.
CPC ...................................... *A01G 7/04* (2013.01)

(58) Field of Classification Search
CPC .... A01G 7/00; A01G 7/04; A01G 7/06; H01P 7/10; H01P 1/20309; H01P 1/2084; H01P 3/16
See application file for complete search history.

(56) References Cited

U.S. PATENT DOCUMENTS

| | | | |
|---|---|---|---|
| 5,508,008 A * | 4/1996 | Wasser | C01B 13/11 422/907 |
| 5,740,627 A * | 4/1998 | Levengood | A01C 1/00 47/1.3 |
| 10,502,797 B2 * | 12/2019 | Rinard | G01R 33/34092 |
| 2016/0023183 A1 * | 1/2016 | Levin | A61D 7/00 422/186.04 |

FOREIGN PATENT DOCUMENTS

WO  WO-2017049263 A1 * 3/2017 ............. G02B 6/032

OTHER PUBLICATIONS https://tarmin.ee/en/new-protected-plan/. The newest plant protaction. Electromagnetic resonator ERone. 2018.*

* cited by examiner

*Primary Examiner* — David J Parsley
*Assistant Examiner* — Danielle A Clerkley (57) ABSTRACT

The present invention is directed to the modulation and entrainment of a local biofield through the use of a biofield modulation device comprising a plurality of resonators and a first and second side. Each resonator of the plurality of resonators comprises a dielectric substrate, a resonant cavity, and a conductive coating. The resonant cavity collect low potential ambient radiation and amplifies it to energize the dielectric substrate. This generates a surface effect in the conductive coating that causes it to emit biofield radiation that modulates and entrains the local biofield in the direction that the conductive coating is pointing. The modulation and entrainment of a local biofield catalyzes the growth of plants when compared to average growth rates.

15 Claims, 6 Drawing Sheets

BIOFIELD MODULATOR

This application is a non-provisional and claims benefit of U.S. Provisional Application No. 62/810,715 filed Feb. 26, 2019, the specification(s) of which is/are incorporated herein in their entirety by reference.

BACKGROUND OF THE INVENTION

Every living being emits its own biofield. While the biofield is subtle and not yet fully characterized, its existence is widely accepted, for example in the fields of alternative and complementary medicine. Kafatos et al., "Biofield Science: Current Physics Perspectives," Glob. Adv. Health Med. 2015 November; 4(Suppl): 25-34. The biofield is believed to comprise both energy and information regulating homeodynamic and homeostatic functions of living organisms. Id. at 25. As currently understood, the collective biofield consists of at least the following components: electromagnetic, acoustic, optical, and non-classical energy fields associated with living organisms. Id. at 29.

FIELD OF THE INVENTION

The field of the invention is a device and system for modulation of a biofield, e.g. for the benefit of living organisms.

BRIEF SUMMARY OF THE INVENTION

It is an objective of the present invention to provide devices and systems that allow for the modulation of a local biofield for the purpose of catalyzing plant growth, as specified in the independent claims. Embodiments of the invention are given in the dependent claims. Embodiments of the present invention can be freely combined with each other if they are not mutually exclusive.

The invention described herein is a biofield modulator comprising a plurality of biofield modulating resonators ("resonators") arranged in such a way as to modulate a biofield of, or associated with, one or more living organisms. Each resonator comprises a dielectric member having a surface, at least part of which surface has disposed thereon a metallic coating ("emitter"), and at least a part of which surface does not have a metallic coating disposed thereon ("collector"). The modulator requires no conventional power source. In preferred embodiments, the modulator does not include, and is in fact isolated from all conventional power sources. In some preferred embodiments, the modulator does not include, and is in fact electrically isolated from all electrical power sources, such as A/C and D/C power sources. A modulator may comprise an array of a plurality of biofield resonators arranged to orient the emitter of each resonator toward one or more organisms to modulate a biofield associated with said one or more biological organisms. The modulator may be configured to modulate a biofield associated with an animal, such as a human, or one or more plants or plant species.

In some embodiments, a biofield modulator comprises a plurality of resonators, each resonator comprising a dielectric substrate, a resonant cavity, and a conductive coating. Each resonator may collect and amplify low potential ambient radiation within the resonant cavity. This creates a standing wave structure within the resonant cavity that energizes the dielectric substrate. The energizing of the dielectric substrate generates a surface effect in the conductive coating that causes it to emit biofield radiation. The biofield modulator may further comprise a first and second side, connected to each other by the plurality of resonators, such that each resonator in the plurality of resonators is configured with the conductive coating facing the same direction. This causes biofield modulation and entrainment cast in the direction that the conductive coating is pointing.

This modulation can be pointed towards a plant to noticeably catalyze its growth when compared to the plant's normal growth rate. Furthermore, this modulation may enhance the growing medium in which the plant is disposed, catalyzing the growth of the plant's roots and the propagation of helpful microorganisms in the growing medium when compared to the plant's growth rate in an unaltered growing medium. The modulator may catalyze growth in the plant without requiring inputs such as fertilizers, sunlight, or electricity, providing a cost-effective way for organic farmers to increase their output. The modulator may be substance-free, maintenance-free, require no input power, have no moving parts, and may be credibly expected to operate for many years, if not decades.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
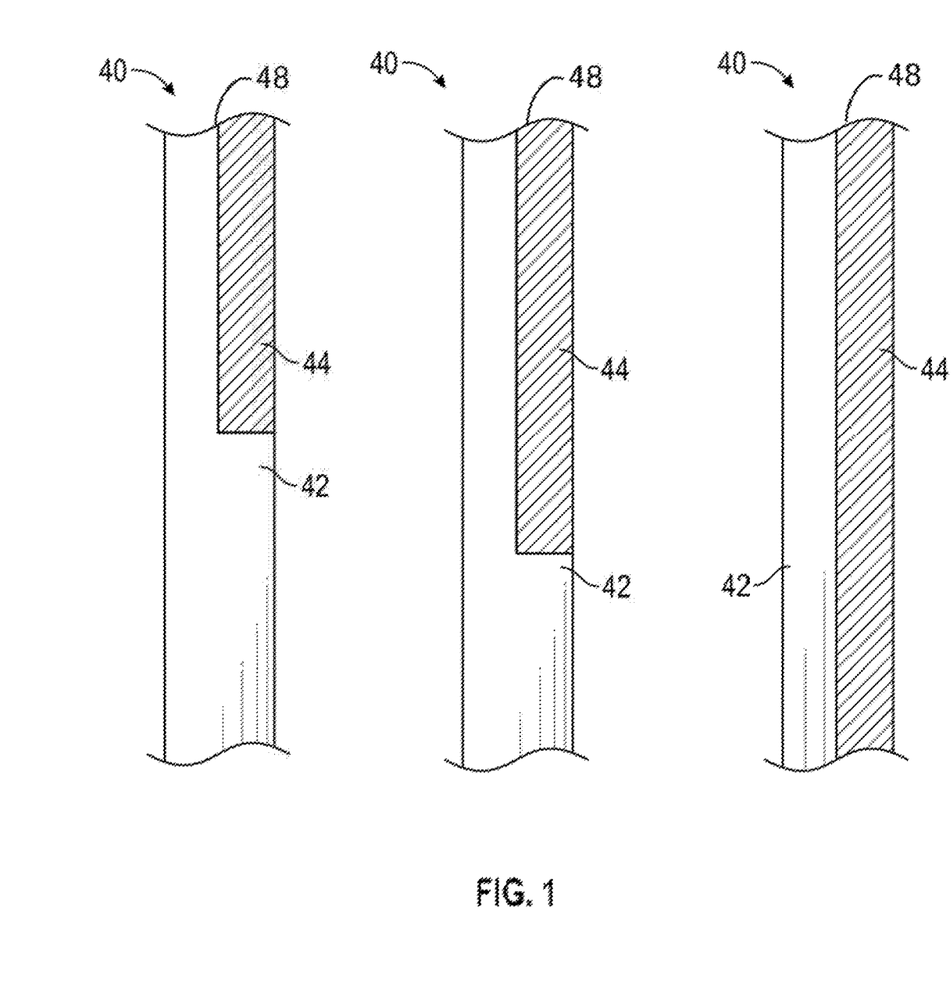
FIG. 1 shows multiple embodiments of a resonator. The conductive coating coats at least a portion but less than an entirety of the dielectric substrate and may cover an entire length of the dielectric substrate.
Figure 2:
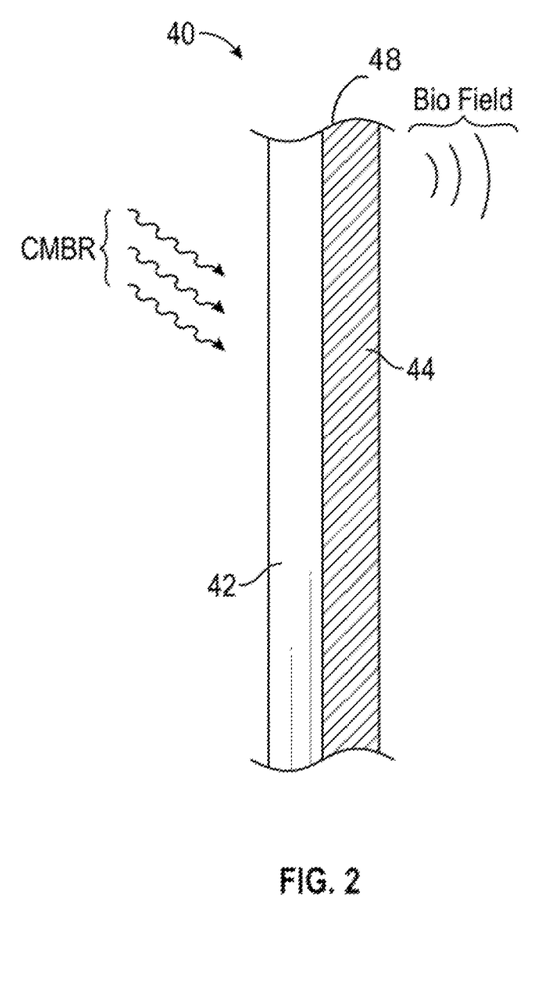
FIG. 2 shows a method of an embodiment of a resonator as CMBR waves are absorbed by the dielectric substrate and biofield waves are emitted by the conductive coating.
Figure 3:
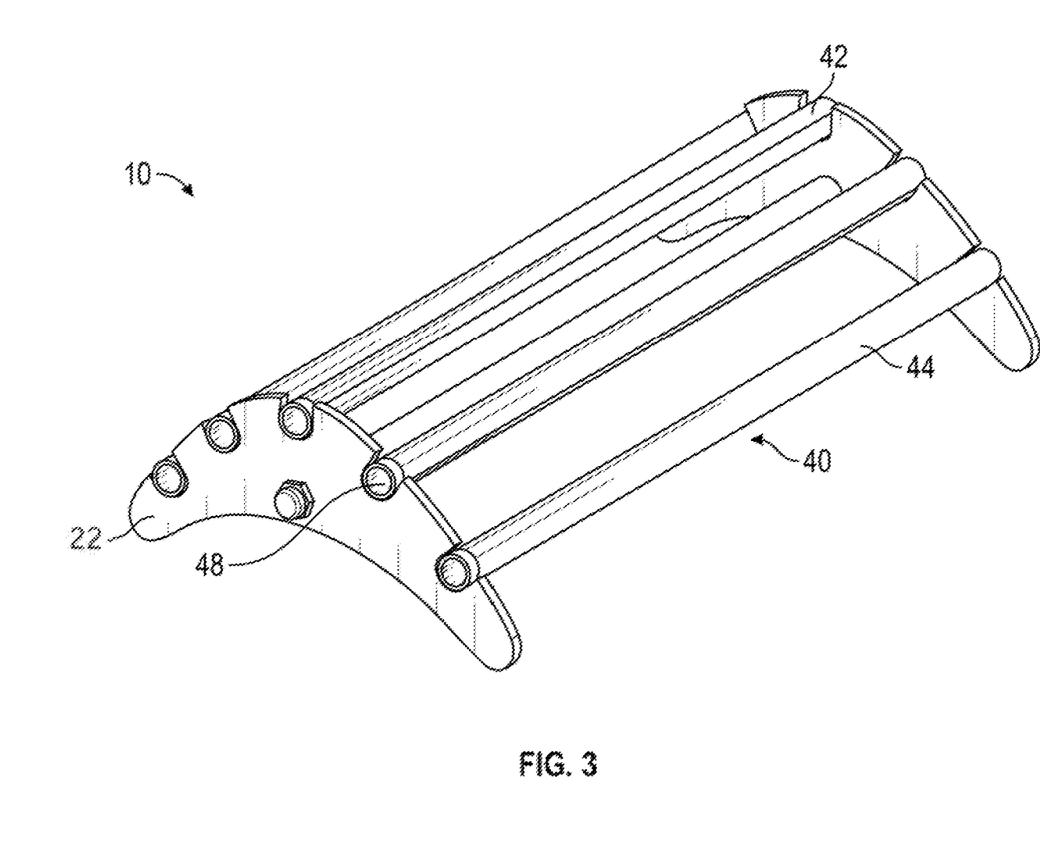
FIG. 3 shows a perspective ISO view of an embodiment of a biofield modulation device.
Figure 4:
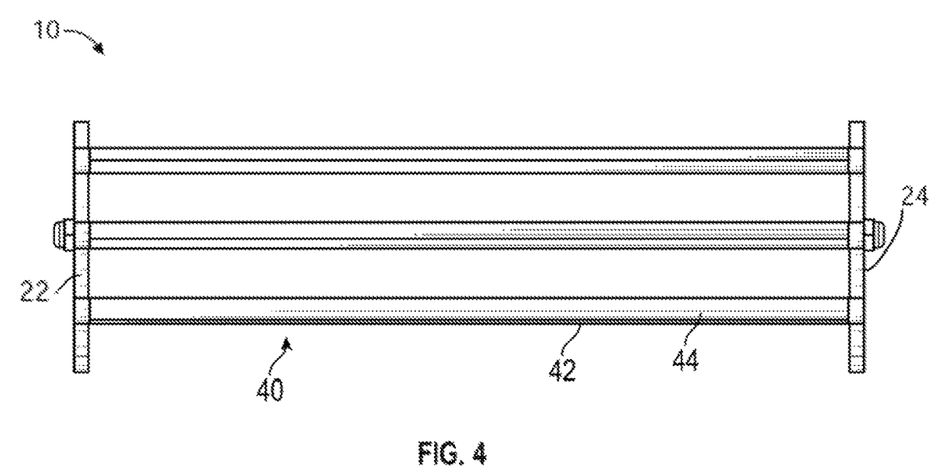
FIG. 4 shows a perspective front view of an embodiment of a biofield modulation device.
Figure 5:
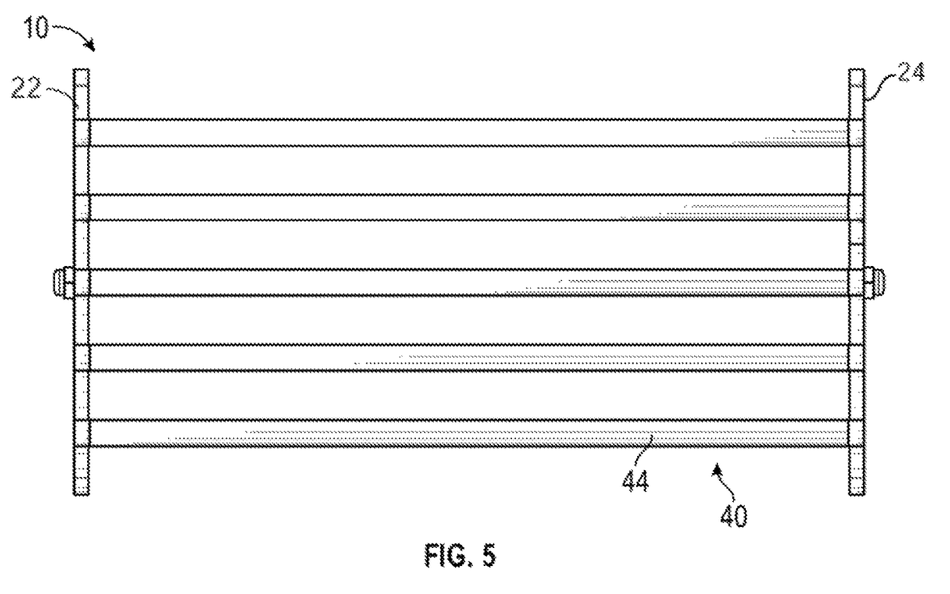
FIG. 5 shows a perspective top view of an embodiment of a biofield modulation device.
Figure 6:
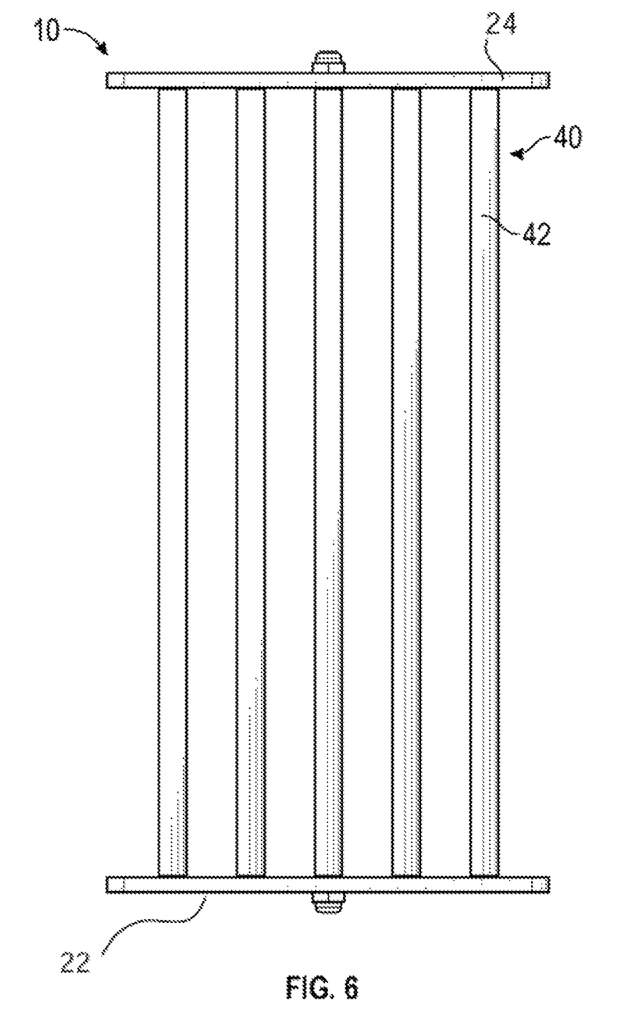
FIG. 6 shows a perspective bottom view of an embodiment of a biofield modulation device.
Figure 7:
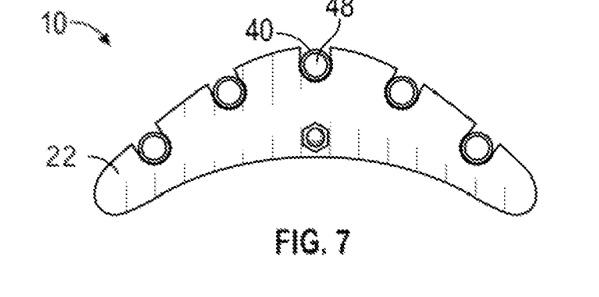
FIG. 7 shows a perspective side view of an embodiment of a biofield modulation device.

Following is a list of elements corresponding to a particular element referred to herein:

10 biofield modulator
22 first side of biofield modulator
24 second side of biofield modulator
40 resonator
42 dielectric substrate of resonator
44 conductive coating of resonator
48 resonant cavity of resonator
80 rack
82 first side of rack
84 second side of rack
86 passable platform of rack
110 biofield modulator with rotatable resonators
122 first side of biofield modulator with rotatable resonators
124 second side of biofield modulator with rotatable resonators
149 resonator peg
210 biofield modulator with pivoting plurality of resonators
222 first side of biofield modulator with pivoting plurality of resonators
224 second side of biofield modulator with pivoting plurality of resonators
251 first pivot connector
252 second pivot connector
282 first stand side
284 second stand side Referring to FIGS. 1-2, the present invention features a resonator (40). In some embodiments, the resonator (40) may comprise a dielectric substrate (42), a resonant cavity (48), and a conductive coating (44). In some embodiments, the resonator (40) may be a cylinder of the dielectric substrate (42) with a hollow center acting as the resonant cavity (48). The resonant cavity (48) may act as a high-frequency antenna. The conductive coating (44) may cover at least a portion but less than an entirety of an outer surface of the dielectric substrate (42). In other embodiments, the resonator (40) may be a cylinder of a material of the conductive coating (44) with a hollow center acting as the resonant cavity (48), and a coating of a material of the dielectric substrate may be disposed on at least a portion of an outer surface of the resonator (40). In some embodiments, the conductive coating (44) of the resonator (40) may comprise copper. In other embodiments, the conductive coating (44) of the resonator (40) may comprise chromium. In some embodiments, the conductive coating (44) of the resonator (40) may coat a portion of the circumference of the dielectric substrate (42) and an entirety of a length of the dielectric substrate (42). In other embodiments, the conductive coating (44) may coat a portion of the circumference of the dielectric substrate (42) and a portion of the length of the dielectric substrate, such that a resonator may have length $L_t$, a conductive coating (44) of length $L_c$ shorter than Lt, and a dielectric substrate (42) of length $L_d$, such that $L_d=L_t-L_c$, a ratio of $L_t:L_c$ approximately equals a ratio of $L_c:L_d$, and a ratio of $L_c:L_d$ approximately equals 1.618. As depicted in FIG. 2, the resonant cavity (48) may receive and amplify low potential ambient radiation, thus generating a standing wave structure within the resonant cavity (48) that energizes the dielectric substrate (42) surrounding the resonant cavity (48). In some embodiments, the low potential ambient radiation is cosmic microwave background radiation (CMBR). The energizing of the dielectric substrate (42) may trigger a surface effect in the conductive coating (44), thus causing the conductive coating (44) to emit biofield radiation. The biofield radiation emitted by the conductive coating (44) may cause modulation and entrainment of the local biofield.

Referring now to FIGS. 3-7, the present invention features a device (10) for biofield modulation. In some embodiments, the device (10) may comprise a plurality of resonators. Each resonator (40) may comprise a dielectric substrate (42), a resonant cavity (48), and a metallic coating (44). Each resonator (40) may be a cylinder of the dielectric substrate (42) with a hollow center acting as the resonant cavity (48). The resonant cavity (48) may act as a high-frequency antenna. In some embodiments, the conductive coating (44) may cover at least a portion but less than an entirety of an outer surface of the dielectric substrate (42). In other embodiments, the resonator (40) may be a cylinder of a material of the conductive coating (44) with a hollow center acting as the resonant cavity (48), and a coating of a material of the dielectric substrate may be disposed on an inner surface of the resonator (40). In some embodiments, the conductive surface (44) of at least some resonators (40) of the plurality of resonators may comprise copper. In other embodiments, the conductive surface (44) of at least some resonators (40) of the plurality of resonators may comprise chromium. In some embodiments, the conductive coating (44) at least some of the resonators (40) of the plurality of resonators may coat a portion of the circumference of the dielectric substrate (42) and an entirety of a length of the dielectric substrate (42). In other embodiments, the conductive coating (44) of at least some of the resonators (40) of the plurality of resonators may coat a portion of the circumference of the dielectric substrate (42) and a portion of the length of the dielectric substrate, such that a resonator may have length $L_t$, a conductive coating (44) of length $L_c$ shorter than Lt, and a dielectric substrate (42) of length $L_d$, such that $L_d=L_t-L_c$, a ratio of $L_t:L_c$ approximately equals a ratio of $L_c:L_d$, and a ratio of $L_c:L_d$ approximately equals 1.618. The resonant cavity (48) may receive and amplify low potential ambient radiation, thus generating a standing wave structure within the resonant cavity (48) that energizes the dielectric substrate (42) surrounding the resonant cavity (48). The energizing of the dielectric substrate (42) may trigger a surface effect in the conductive coating (44), thus causing the conductive coating (44) to emit biofield radiation. The biofield radiation emitted by the conductive coating (44) may cause modulation and entrainment of the local biofield.

In some embodiments, the device may further comprise a first side (22) and a second side (24). The first side (22) and the second side (24) may be connected by the plurality of resonators, such that each resonator (40) of the plurality of resonators is configured with the conductive coating (44) facing upwards. This may allow the device (10) to emit biofield radiation to objects above the device (10). In some embodiments, each resonator (40) of the plurality of resonators is parallel to the ground and perpendicular to both the first side (22) and the second side (24). In some embodiments, the first side (22) and the second side (24) are additionally connected by a dowel of the same length as a resonator (40) of the plurality of resonators, such that the dowel is parallel to both the ground and each resonator (40) of the plurality of resonators and perpendicular to the first side (22) and the second side (24). In some embodiments, the plurality of resonators are connected to the first side (22) by a plurality of first spaces and are connected to the second side (24) by a plurality of second spaces such that each resonator (40) of the plurality of resonators fills one first space and one second space. In some embodiments, the plurality of resonators are arranged in a convex arc formation. In some embodiments, the low potential ambient radiation is cosmic microwave background radiation (CMBR).

Figure 8:
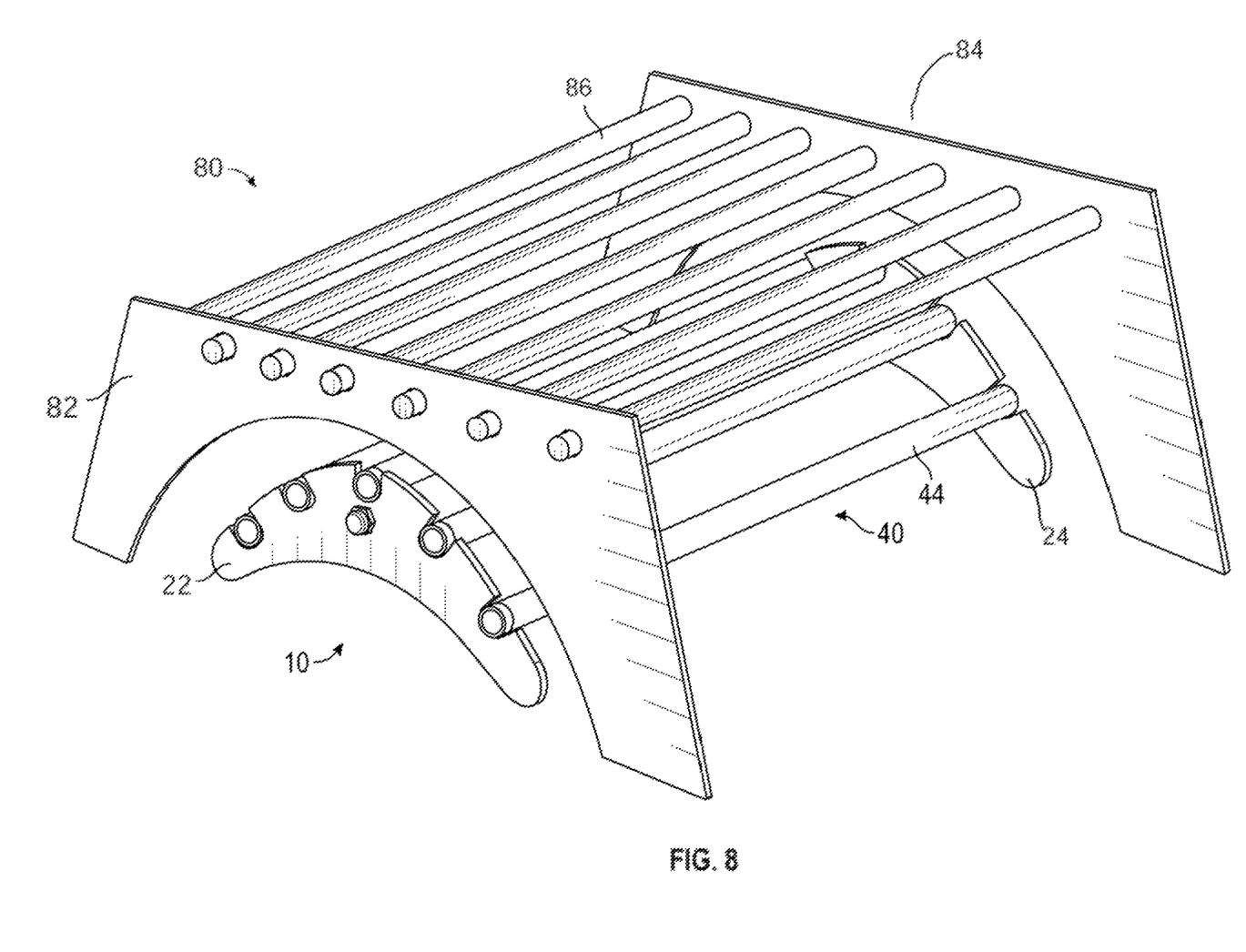
FIG. 8 shows a perspective ISO view of an embodiment of a system of biofield modulation, comprising a biofield modulator disposed under a rack.

Referring to FIG. 8, the present invention features a system for stimulating plant growth through the use of biofield modulation. In some embodiments, the system may comprise a biofield modulator (10). In some embodiments, the biofield modulator (10) may comprise a plurality of resonators. Each resonator (40) may comprise a dielectric substrate (42), a resonant cavity (48), and a metallic coating (44). Each resonator (40) may be a cylinder of the dielectric substrate (42) with a hollow center acting as the resonant cavity (48). The resonant cavity (48) may act as a high-frequency antenna. The conductive coating (44) may cover at least a portion but less than an entirety of an outer surface of the dielectric substrate (42). In some embodiments, the conductive surface (44) of at least some resonators (40) of the plurality of resonators may comprise copper. In other embodiments, the conductive surface (44) of at least some resonators (40) of the plurality of resonators may comprise chromium. In some embodiments, the conductive coating (44) at least some of the resonators (40) of the plurality of resonators may coat a portion of the circumference of the dielectric substrate (42) and an entirety of a length of the dielectric substrate (42). In other embodiments, the conductive coating (44) of at least some of the resonators (40) of the plurality of resonators may coat a portion of the circumference of the dielectric substrate (42) and a portion of the length of the dielectric substrate, such that a resonator may have length $L_t$, a conductive coating (44) of length $L_c$ shorter than Lt, and a dielectric substrate (42) of length $L_d$, such that $L_d=L_t-L_c$, a ratio of $L_t:L_c$ approximately equals a ratio of $L_c:L_d$, and a ratio of $L_c:L_d$ approximately equals 1.618. The resonant cavity (48) may receive and amplify low potential ambient radiation, thus generating a standing wave structure within the resonant cavity (48) that energizes the dielectric substrate (42) surrounding the resonant cavity (48). The energizing of the dielectric substrate (42) may trigger a surface effect in the conductive coating (44), thus causing the conductive coating (44) to emit biofield radiation. The biofield radiation emitted by the conductive coating (44) may cause modulation and entrainment of the local biofield.

In some embodiments, the biofield modulator may further comprise a first side (22) and a second side (24). The first side (22) and the second side (24) may be connected by the plurality of resonators, such that each resonator (40) of the plurality of resonators is configured with the conductive coating (44) facing upwards. This may allow the biofield modulator (10) to emit biofield radiation to objects above the device (10). In some embodiments, each resonator (40) of the plurality of resonators is parallel to the ground and perpendicular to both the first side (22) and the second side (24). In some embodiments, the first side (22) and the second side (24) are additionally connected by a dowel of the same length as a resonator (40) of the plurality of resonators, such that the dowel is parallel to both the ground and each resonator (40) of the plurality of resonators and perpendicular to the first side (22) and the second side (24). In some embodiments, the plurality of resonators are connected to the first side (22) by a plurality of first spaces and are connected to the second side (24) by a plurality of second spaces such that each resonator (40) of the plurality of resonators fills one first space and one second space. In some embodiments, the plurality of resonators are arranged in a convex arc formation. In some embodiments, the low potential ambient radiation is cosmic microwave background radiation (CMBR).

The system may further comprise a rack (80). The rack (80) may comprise a first rack side (82), a second rack side (84), and a passable platform (86). In some embodiments, the biofield modulator (10) is capable of sitting underneath the rack (80). The passable platform (86) may be capable of supporting one or more items and allowing biofield radiation to pass from one side of the passable platform (86) to the other. In some embodiments, the passable platform (86) comprises a plurality of dowels. Each dowel in the plurality of dowels may connect to both the first rack side (82) and the second rack side (84), such that the item(s) can rest on top of the plurality of dowels and biofield radiation can pass through the plurality of dowels.

In some embodiments, the biofield modulator (10) may rest underneath the passable platform (86) of the rack (80), and one or more plants may rest on top of the passable platform (86) of the rack (80). The biofield radiation emitted by the conductive coating (44) of the biofield modulator (10) may be emitted in the direction of the plant(s), such that the biofield radiation passes through the passable platform (86) and is absorbed by the plant(s). In some embodiments, the biofield radiation stimulates faster growth in the plant(s).

Figure 9:
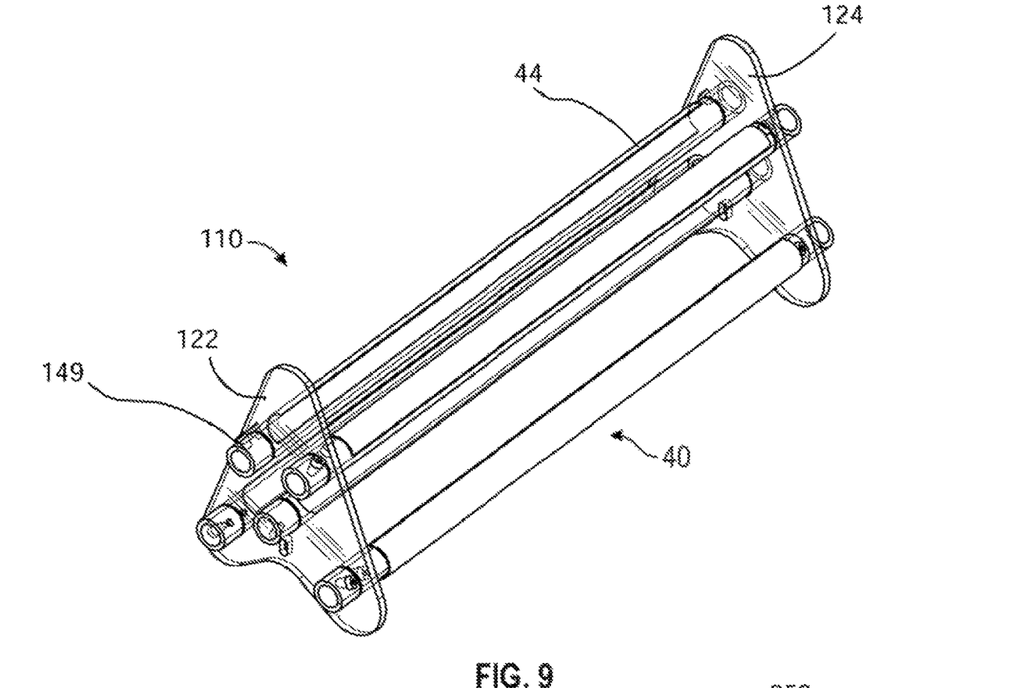
FIG. 9 shows a perspective ISO view of an embodiment of a biofield modulation device with rotatable resonators.

Referring to FIG. 9, an embodiment of the present invention features a device (110) for biofield modulation with the additional feature of rotatable resonators. The device (110) may comprise a plurality of resonators, each resonator (40) comprising a dielectric substrate (42), a conductive coating (44), a resonant cavity (48), and a plurality of resonator pegs (149). The device (110) may further comprise a first side (122) and a second side (124) connected by the plurality of resonators. For both the first side (122) and the second side (124), a resonator (40) may not be adhered to the side so as to allow the resonator (40) to rotate, and the plurality of resonator pegs (149) may be disposed on the resonator (40) in a configuration that prevents the resonator (40) from detaching from the side. The rotation of each individual resonator (40) of the plurality of resonators may allow for biofield modulation in a plurality of directions.

Figure 10:
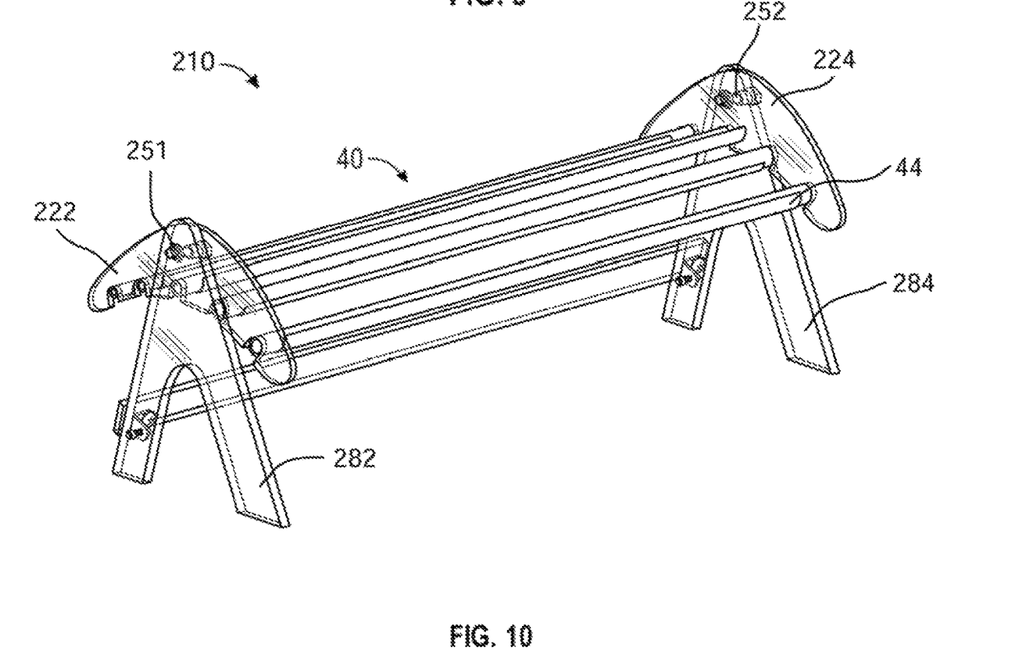
FIG. 10 shows a perspective ISO view of an embodiment of a biofield modulation device with a pivoting plurality of resonators.

Referring to FIG. 10, an embodiment of the present invention features a device (210) for biofield modulation with the additional feature of a pivoting plurality of resonators. The device (210) may comprise a plurality of resonators, each resonator (40) comprising a dielectric substrate (42), a conductive coating (44), and a resonant cavity (48). The device (210) may further comprise a first side (222) and a second side (224) connected by the plurality of resonators. The plurality of resonators may be arranged in a convex arc formation with the conductive coating (44). The device (210) may further comprise a first stand side (282) and a second stand side (284) with a first pivot connector (251) connecting the first side (222) to the first stand side (282) and a second pivot connector (252) connecting the second side (224) to the second stand side (284) such that the plurality of resonators may be pointed in a plurality of directions by pivoting the first side (222) and the second side (224) around the first pivot connector (251) and the second pivot connector (252), respectively. The pivoting plurality of resonators may allow for biofield modulation in an easily-configurable direction.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A device (10) for biofield modulation, the device comprising:
   a. a plurality of resonators, each resonator (40) comprising:
      i. a dielectric substrate (42),
      ii. a resonant cavity (48), and
      iii. a conductive coating (44),
      wherein the resonant cavity (48) is a hollow region of the dielectric substrate (42),
      wherein the conductive coating (44) coats at least a portion of an outer surface of the dielectric substrate (42),
      wherein the resonant cavity (48) absorbs and amplifies low potential ambient radiation,
      wherein the dielectric substrate (42) is energized by low potential ambient radiation in the resonant cavity (48), and
      wherein the conductive coating (44) emits biofield radiation as a result of a surface effect triggered by the energized dielectric substrate (42);
   b. a first side (22); and
   c. a second side (24);
   wherein the first side (22) and the second side (24) are connected by the plurality of resonators; and
   wherein the plurality of resonators are configured such that the conductive coating (44) of each resonator (40) faces upwards.

2. The device of claim 1, wherein the low potential ambient radiation is cosmic microwave background radiation (CMBR).

3. The device of claim 1, wherein each resonator (40) of the plurality of resonators is parallel to the ground.

4. The device of claim 1, wherein the plurality of resonators are arranged in a convex arc formation.

5. The device of claim 1, wherein each resonator (40) of the plurality of resonators has a cylindrical shape.

6. The device of claim 1, wherein the conductive surface (44) of at least some of the resonators comprises copper.

7. The device of claim 1, wherein the conductive surface (44) of at least some of the resonators comprises chromium.

8. The device of claim 1, wherein the conductive surface (44) of at least some of the resonators coats a portion of a circumference of the resonator (40) and an entirety of a length of the resonator (40).

9. A system for stimulating plant growth through the use of biofield modulation, the system comprising:
   a. a biofield modulator (10), the biofield modulator comprising:
      i. a plurality of resonators, each resonator (40) comprising:
         1. a dielectric substrate (42),
         2. a resonant cavity (48), and
         3. a conductive coating (44),
      wherein the resonant cavity (48) is a hollow region of the dielectric substrate (42),
      wherein the conductive coating (44) coats at least a portion of an outer surface of the dielectric substrate (42),
      wherein the resonant cavity (48) absorbs and amplifies low potential ambient radiation,
      wherein the dielectric substrate (42) is energized by low potential ambient radiation in the resonant cavity (48), and
      wherein the conductive coating (44) emits biofield radiation as a result of a surface effect triggered by the energized dielectric substrate (42);
      ii. a first side (22); and
      iii. a second side (24);
      wherein the first side (22) and the second side (24) are connected by the plurality of resonators; and
      wherein the plurality of resonators are configured such that the conductive coating (44) of each resonator (40) faces upwards; and
   b. a rack (80), the rack comprising:
      i. a first rack side (82);
      ii. a second rack side (84); and
      iii. a passable platform (86);
   wherein the passable platform (86) is capable of supporting one or more items;
   wherein biofield radiation is capable of passing through the passable platform (86); and
   wherein the biofield modulator (10) is capable of resting underneath the passable platform (86);
   wherein one or more plants are placed on the passable platform (86);
   wherein the biofield radiation emitted by the conductive coating (44) of the plurality of resonators is emitted in the direction of one or more plants;
   wherein the biofield radiation is absorbed by one or more plants; and
   wherein the biofield radiation catalyzes growth in one or more plants.

10. The system of claim 9, wherein the low potential ambient radiation is cosmic microwave background radiation (CMBR).

11. The system of claim 9, wherein each resonator (40) of the plurality of resonators is parallel to the ground.

12. The system of claim 9, wherein the plurality of resonators are arranged in a convex arc formation.

13. The system of claim 9, wherein the conductive surface (44) of at least some of the resonators comprises copper.

14. The system of claim 9, wherein the conductive surface (44) of at least some of the resonators comprises chromium.

15. The system of claim 9, wherein the conductive surface (44) of at least some of the resonators coats a portion of a circumference of the resonator (40) and an entirety of a length of the resonator (40).

* * * * *